(12) United States Patent
Hao et al.

(10) Patent No.: US 11,488,403 B2
(45) Date of Patent: Nov. 1, 2022

(54) SEMANTIC SEGMENTATION METHOD AND SYSTEM FOR REMOTE SENSING IMAGE FUSING GIS DATA

(71) Applicant: Nanjing University of Aeronautics and Astronautics, Nanjing (CN)

(72) Inventors: Jie Hao, Nanjing (CN); Yuhang Gu, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 78 days.

(21) Appl. No.: 17/144,256

(22) Filed: Jan. 8, 2021

(65) Prior Publication Data

US 2022/0092368 A1 Mar. 24, 2022

(30) Foreign Application Priority Data

Sep. 21, 2020 (CN) .......................... 202010994823.6

(51) Int. Cl.
*G06V 20/13* (2022.01)
*G06V 30/262* (2022.01)
*G06T 7/10* (2017.01)
*G06K 9/62* (2022.01)
*G06T 3/60* (2006.01)
(Continued)

(52) U.S. Cl.
CPC ......... *G06V 30/274* (2022.01); *G06K 9/6256* (2013.01); *G06K 9/6288* (2013.01); *G06T 3/60* (2013.01); *G06T 5/006* (2013.01); *G06T 7/10* (2017.01); *G06V 10/774* (2022.01); *G06V 20/13* (2022.01); *G06V 20/70* (2022.01); *G06T 2207/20081* (2013.01)

(58) Field of Classification Search
CPC ..... G06T 7/10–194; G06T 3/60; G06T 5/006; G06T 2207/20081; G06V 20/70; G06V 20/10–182; G06V 30/274; G06V 10/774; G06V 20/13
See application file for complete search history.

(56) References Cited

U.S. PATENT DOCUMENTS

| 2014/0205189 A1* | 7/2014 | Cao | ...................... G06V 20/188 |
| | | | 382/160 |
| 2022/0092368 A1* | 3/2022 | Hao | ...................... G06V 20/70 |

OTHER PUBLICATIONS

Sun et al "Fully convolutional Networks for Semantic Segmentation of Very High Resolution Remotely Sensed Image Combined with DSM" IEEE 2018 (Year: 2018).*

* cited by examiner

*Primary Examiner* — Sean T Motsinger
(74) *Attorney, Agent, or Firm* — McCarter & English, LLP; Yu Lu

(57) ABSTRACT

The present disclosure relates to a semantic segmentation method and system for a remote sensing image fusing GIS data. The method includes: obtaining a first remote sensing data training set and first GIS data; preprocessing the first remote sensing data training set to obtain a second remote sensing data training set; preprocessing the first GIS data based on the second remote sensing data training set to obtain second GIS data; performing data enhancement on the second remote sensing data training set to obtain a third remote sensing data training set; training a semantic segmentation model based on the third remote sensing data training set and the second GIS data; and performing semantic segmentation on the remote sensing image to be segmented based on the first GIS data and the trained semantic segmentation model to obtain a semantic set.

5 Claims, 2 Drawing Sheets

(51) Int. Cl.
*G06T 5/00* (2006.01)
*G06V 20/70* (2022.01)
*G06V 10/774* (2022.01)

SEMANTIC SEGMENTATION METHOD AND SYSTEM FOR REMOTE SENSING IMAGE FUSING GIS DATA

REFERENCE TO RELATED APPLICATION

This applications claims priority to Chinese Patent Application No. 202010994823.6, filed on Sep. 21, 2020, the entire contents of which are incorporated herein by reference.

TECHNICAL FIELD

The present disclosure relates to the technical field of semantic segmentation, and in particular, to a semantic segmentation method and system for a remote sensing image fusing geographic information system (GIS) data.

BACKGROUND OF THE INVENTION

After years of development, satellite remote sensing technologies make great progress in terms of spectral resolution, spatial resolution, and time resolution, and have a capability of high-spectral and high-spatial resolution and full-time earth observation. Generation of high-resolution remote sensing images provides more convenient and more detailed data sources for civil use such as land use, urban planning, and environmental testing.

Different from image classification, semantic segmentation requires classification of each pixel in an image. Semantic segmentation of high-resolution remote sensing images plays a very important role in and provides a good foundation for land classification, smart cities, etc. However, it is very difficult to obtain a highly accurate semantic segmentation result, especially in dense urban buildings. In conventional segmentation of remote sensing images, manual segmentation is conducted relying on a large amount of human power, and segmentation results are continuously improved through subsequent manual error correction. This method usually consumes a lot of money and human power, and it is difficult to deeply explore the potential value of big remote sensing data.

In the past few years, continuous development of machine learning and major achievements of deep learning in images brought new breakthroughs in semantic segmentation of remote sensing images. Machine learning methods are mainly pixel-based classification methods. For example, a support vector machine method and the like can be used to quickly classify pixels. However, in this method, a spatial topological relationship of the image is not considered. Therefore, a segmentation result usually contains a lot of noise. The emergence of fully convolutional neural networks is a major breakthrough in semantic segmentation. It represents that semantic segmentation enters the era of deep learning. Afterwards, many networks based on full convolution were proposed. Among them, DeepLabV3+ is the most versatile and relatively effective network in existing semantic segmentation models based on deep learning. However, high-resolution remote sensing images contain complex features, and buildings, trees, and roads are intertwined with and obscure each other, resulting in poor semantic segmentation effects.

In addition, in existing data fusion technologies, a remote sensing image channel and an open street map (OSM) image channel are combined and input to achieve fusion. However, it is obviously unreasonable to simply mix two pieces of heterogeneous data. In some studies, FuseNet is used to fuse remote sensing data and OSM data. However, FuseNet uses a relatively simple SegNet network structure, resulting in poor fusion effects.

SUMMARY OF THE INVENTION

The present disclosure aims to provide a semantic segmentation method and system for a remote sensing image fusing GIS data, so as to resolve the prior-art problem of low segmentation accuracy in terms of buildings, trees, and roads that obscure each other.

To achieve the above objective, the present disclosure provides the following solutions:

A semantic segmentation method for a remote sensing image fusing geographic information system (GIS) data, including:

obtaining a first remote sensing data training set and first GIS data, where the first remote sensing data training set includes n remote sensing training images, and n is a positive integer greater than 1;

preprocessing the first remote sensing data training set to obtain a second remote sensing data training set;

preprocessing the first GIS data based on the second remote sensing data training set to obtain second GIS data;

performing data enhancement on the second remote sensing data training set to obtain a third remote sensing data training set;

training a semantic segmentation model based on the third remote sensing data training set and the second GIS data; and performing semantic segmentation on the remote sensing image to be segmented based on the first GIS data and the trained semantic segmentation model to obtain a semantic set.

Preferably, the preprocessing the first remote sensing data training set to obtain a second remote sensing data training set includes:

setting the following condition: i=1;

performing geometric correction on an ith remote sensing training image to obtain an ith corrected remote sensing image;

performing coordinate system conversion on the ith corrected remote sensing image to obtain an ith coordinate remote sensing image; and determining whether i is greater than or equal to n; and if i is less than n, setting the following condition: i=i+1, and returning to the step of "performing geometric correction on an ith remote sensing training image to obtain an ith corrected remote sensing image"; or if i is greater than or equal to n, outputting the second remote sensing data training set, where the second remote sensing data training set includes n coordinate remote sensing images.

Preferably, the preprocessing the first GIS data based on the second remote sensing data training set to obtain second GIS data includes:

setting the following condition: i=1;

aligning the ith coordinate remote sensing image with the first GIS data based on latitude and longitude coordinates to obtain an ith aligned image;

tailoring the first GIS data in the ith aligned image based on the ith coordinate remote sensing image to obtain an ith GIS image; and determining whether i is greater than or equal to n; and if i is less than n, setting the following condition: i=i+1, and returning to the step of "aligning the ith coordinate remote sensing image with the first GIS data based on latitude and longitude coordinates to obtain an ith aligned image"; or if i is greater than or equal to n, outputting the second GIS data, where the second GIS data includes n GIS images.

Preferably, the performing data enhancement on the second remote sensing data training set to obtain a third remote sensing data training set includes:

setting the following condition: i=1;

zooming in/out the ith coordinate remote sensing image to obtain an ith zoomed-in/out image;

segmenting the ith coordinate remote sensing image to obtain an ith segmented image;

performing mirror flipping on the ith coordinate remote sensing image to obtain an ith flipped image;

rotating the zoomed-in/out image, the segmented image, and the flipped image by a predetermined angle for k times to obtain an ith rotated image, where k is a positive integer greater than 1; and determining whether i is greater than or equal to n; and if i is less than n, setting the following condition: i=i+1, and returning to the step of "zooming in/out the ith coordinate remote sensing image to obtain an ith zoomed-in/out image"; or if i is greater than or equal to n, outputting a zoomed-in/out image set, a segmented image set, a flipped image set, and a rotated image set, where the zoomed-in/out image set includes n zoomed-in/out images, the segmented image set includes n segmented images, the flipped image set includes n flipped images, the rotated image set includes n rotated images, and the third remote sensing data training set includes the zoomed-in/out image set, the segmented image set, the flipped image set, and the rotated image set.

Preferably, after the performing semantic segmentation on the remote sensing image to be segmented based on the first GIS data and the trained semantic segmentation model, the method further includes:

optimizing the semantic set based on a conditional random field to obtain an optimized semantic set.

The present disclosure further provides a semantic segmentation system for a remote sensing image fusing GIS data, including:

a data obtaining module, configured to obtain a first remote sensing data training set and first GIS data, where the first remote sensing data training set includes n remote sensing training images, and n is a positive integer greater than 1;

a first preprocessing module, configured to preprocess the first remote sensing data training set to obtain a second remote sensing data training set;

a second preprocessing module, configured to preprocess the first GIS data based on the second remote sensing data training set to obtain second GIS data;

a data enhancement module, configured to perform data enhancement on the second remote sensing data training set to obtain a third remote sensing data training set;

a model training module, configured to train a semantic segmentation model based on the third remote sensing data training set and the second GIS data; and a semantic segmentation module, configured to perform semantic segmentation on the remote sensing image to be segmented based on the first GIS data and the trained semantic segmentation model to obtain a semantic set.

Preferably, the first preprocessing module includes:

a first initialization unit, configured to set the following condition: i=1;

a correction unit, configured to perform geometric correction on an ith remote sensing training image to obtain an ith corrected remote sensing image;

a conversion unit, configured to perform coordinate system conversion on the ith corrected remote sensing image to obtain an ith coordinate remote sensing image; and a first determining unit, configured to determine whether i is greater than or equal to n; and if i is less than n, set the following condition: i=i+1, and return to the correction unit; or if i is greater than or equal to n, output the second remote sensing data training set, where the second remote sensing data training set includes n coordinate remote sensing images.

Preferably, the second preprocessing module includes:

a second initialization unit, configured to set the following condition: i=1;

an aligning unit, configured to align the ith coordinate remote sensing image with the first GIS data based on latitude and longitude coordinates to obtain an ith aligned image;

a tailoring unit, configured to tailor the first GIS data in the ith aligned image based on the ith coordinate remote sensing image to obtain an ith GIS image; and a second determining unit, configured to determine whether i is greater than or equal to n; and if i is less than n, set the following condition: i=i+1, and return to the aligning unit; or if i is greater than or equal to n, output the second GIS data, where the second GIS data includes n GIS images.

Preferably, the data enhancement module includes:

a third initialization unit, configured to set the following condition: i=1;

a zooming in/out unit, configured to zoom in/out the ith coordinate remote sensing image to obtain an ith zoomed-in/out image;

a segmentation unit, configured to segment the ith coordinate remote sensing image to obtain an ith segmented image;

a flipping unit, configured to perform mirror flipping on the ith coordinate remote sensing image to obtain an ith flipped image;

a rotation unit, configured to rotate the zoomed-in/out image, the segmented image, and the flipped image by a predetermined angle for k times to obtain an ith rotated image, where k is a positive integer greater than 1; and a third determining unit, configured to determine whether i is greater than or equal to n; and if i is less than n, set the following condition: i=i+1, and return to the zooming in/out unit; or if i is greater than or equal to n, output a zoomed-in/out image set, a segmented image set, a flipped image set, and a rotated image set, where the zoomed-in/out image set includes n zoomed-in/out images, the segmented image set includes n segmented images, the flipped image set includes n flipped images, the rotated image set includes n rotated images, and the third remote sensing data training set includes the zoomed-in/out image set, the segmented image set, the flipped image set, and the rotated image set.

Preferably, the system further includes:

a semantic optimization module, configured to optimize the semantic set based on a conditional random field to obtain an optimized semantic set.

According to specific embodiments provided in the present disclosure, the present disclosure has the following technical effects:

The present disclosure relates to a semantic segmentation method and system for a remote sensing image fusing GIS data. The method includes: obtaining a first remote sensing data training set and first GIS data; preprocessing the first remote sensing data training set to obtain a second remote sensing data training set; preprocessing the first GIS data based on the second remote sensing data training set to obtain second GIS data; performing data enhancement on the second remote sensing data training set to obtain a third remote sensing data training set; training a semantic segmentation model based on the third remote sensing data training set and the second GIS data; and performing semantic segmentation on the remote sensing image to be segmented based on the first GIS data and the trained semantic segmentation model to obtain a semantic set. In the present disclosure, semantic segmentation accuracy is improved in terms of buildings, trees, and roads that obscure each other.

BRIEF DESCRIPTION OF DRAWINGS

To illustrate the embodiments of the present disclosure or the technical solutions of the prior art, the accompanying drawings to be used in the embodiments are described briefly below. Apparently, the following accompanying drawings merely illustrates some embodiments of the present disclosure, and a person of ordinary skill in the art can further obtain other accompanying drawings based on these accompanying drawings without creative efforts.

Figure 1:
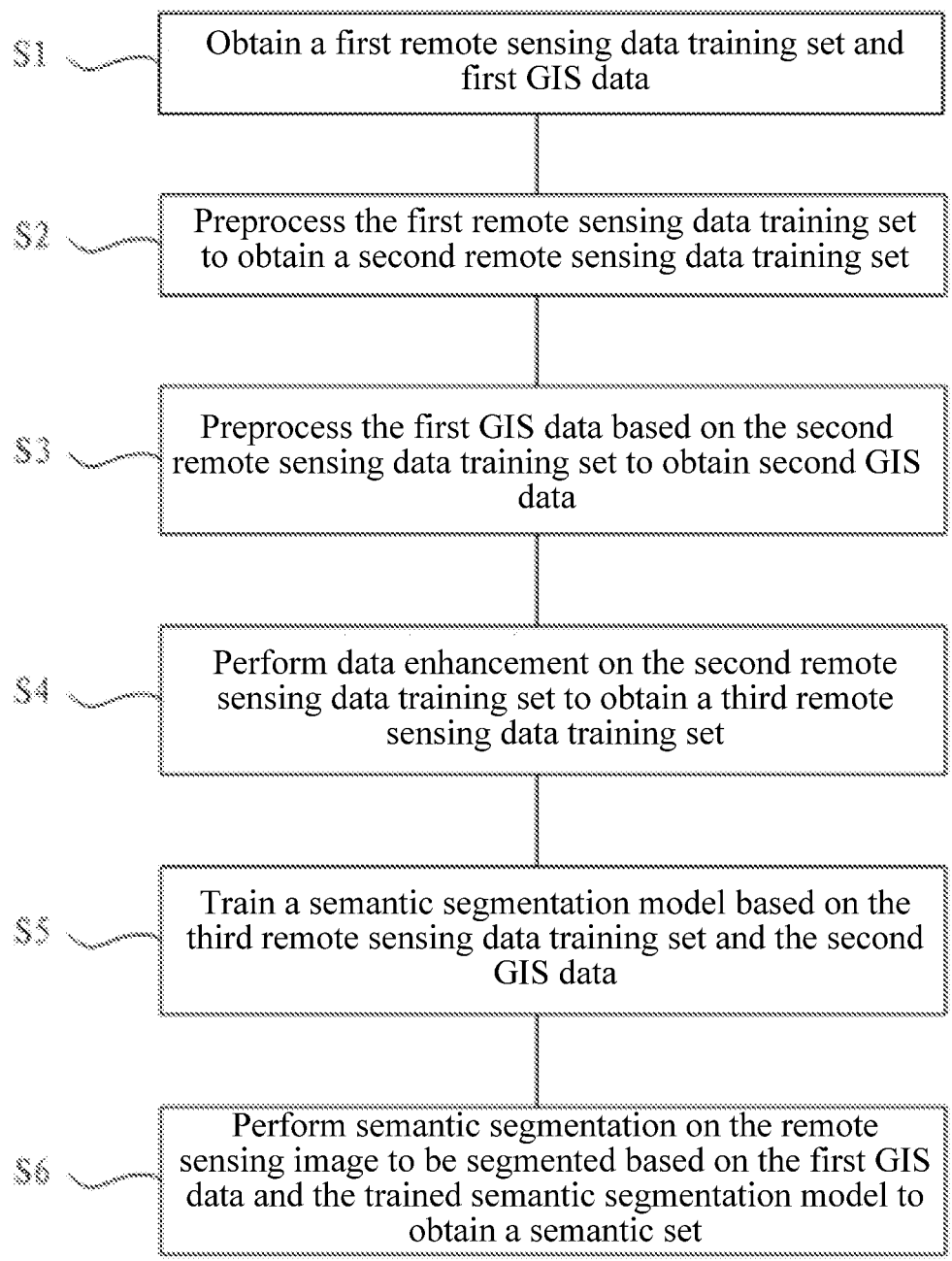
FIG. 1 is a flowchart of a semantic segmentation method for a remote sensing image fusing GIS data according to the present disclosure.

Reference numerals: 1. data obtaining module, 2. first preprocessing module, 3. second preprocessing module, 4. data enhancement module, 5. model training module, 6. semantic segmentation module, and 7. semantic optimization module.

DETAILED DESCRIPTION OF THE INVENTION

The following clearly and completely describes the technical solutions in the embodiments of the present disclosure with reference to accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a semantic segmentation method and system for a remote sensing image fusing GIS data, so as to resolve the prior-art problem of low segmentation accuracy in terms of buildings, trees, and roads that obscure each other.

To make the foregoing objective, features, and advantages of the present disclosure clearer and more comprehensible, the present disclosure is further described in detail below with reference to the accompanying drawings and specific implementations.

FIG. 1 is a flowchart of a semantic segmentation method for a remote sensing image fusing geographic information system (GIS) data. As shown in FIG. 1, the present disclosure provides a semantic segmentation method for a remote sensing image fusing GIS data, including the following steps:

Step S1: Obtain a first remote sensing data training set and first GIS data, where the first remote sensing data training set includes n remote sensing training images, and n is a positive integer greater than 1. The first GIS data is any one of an open street map (OSM) and a Google map. In this embodiment, the OSM is selected.

Step S2: Preprocess the first remote sensing data training set to obtain a second remote sensing data training set.

Specifically, step S2 may include the following:

(1) Initially set the following condition: i=1.

(2) Perform geometric correction on an ith remote sensing training image to obtain an ith corrected remote sensing image. This may resolve the following problem: characteristics such as geometric position, shape, size, size, and orientation of a surface feature on an original image are inconsistent with characteristics of a corresponding surface feature due to impact of a plurality of factors.

(3) Perform coordinate system conversion on the ith corrected remote sensing image to obtain an ith coordinate remote sensing image. The conversion to a reference coordinate system may be conducted to tackle the inconsistency in coordinate systems between remote sensing images from different sources. In this embodiment, the reference coordinate system may be the Beijing 54 coordinate system.

(4) Determine whether i is greater than or equal to n. If i is less than n, set the following condition: i=i+1, and return to the step of "performing geometric correction on an ith remote sensing training image to obtain an ith corrected remote sensing image". If i is greater than or equal to n, output the second remote sensing data training set, where the second remote sensing data training set includes n coordinate remote sensing images.

Preferably, in the present disclosure, each of the coordinate remote sensing images may be processed based on ENVI to eliminate a bow tie effect resulting from earth surface characteristics.

Step S3: Preprocess the first GIS data based on the second remote sensing data training set to obtain second GIS data.

In an optional implementation, step S3 of the present disclosure may include the following:

(1) Initially set the following condition: i=1.

(2) Align the ith coordinate remote sensing image with the first GIS data based on latitude and longitude coordinates to obtain an ith aligned image.

(3) Tailor the first GIS data in the ith aligned image based on the ith coordinate remote sensing image to obtain an ith GIS image, where a pixel size of the ith GIS image is the same as that of the ith coordinate remote sensing image.

(4) Determine whether i is greater than or equal to n. If i is less than n, set the following condition: i=i+1, and return to the step of "aligning the ith coordinate remote sensing image with the first GIS data based on latitude and longitude coordinates to obtain an ith aligned image". If i is greater than or equal to n, output the second GIS data, where the second GIS data includes n GIS images.

Step S4: Perform data enhancement on the second remote sensing data training set to obtain a third remote sensing data training set.

Preferably, the enhancement in the present disclosure may include zooming in/out, segmentation, flipping, and rotation.

Further, step S4 may include the following:

(1) Initially set the following condition: i=1.

(2) Zoom in/out the ith coordinate remote sensing image to obtain an ith zoomed-in/out image.

(3) Segment the ith coordinate remote sensing image to obtain an ith segmented image.

(4) Perform mirror flipping on the ith coordinate remote sensing image to obtain an ith flipped image.

(5) Rotate the zoomed-in/out image, the segmented image, and the flipped image by a predetermined angle for k times to obtain an ith rotated image, where k is a positive integer greater than 1. In the present disclosure, k is set to 4, and the predetermined angle is 90°.

(6) Determine whether i is greater than or equal to n. If i is less than n, set the following condition: i=i+1, and return to the step of "zooming in/out the ith coordinate remote sensing image to obtain an ith zoomed-in/out image". If i is greater than or equal to n, output a zoomed-in/out image set, a segmented image set, a flipped image set, and a rotated image set.

The zoomed-in/out image set includes n zoomed-in/out images. The segmented image set includes n segmented images. The flipped image set includes n flipped images. The rotated image set includes n rotated images. The third remote sensing data training set includes the zoomed-in/out image set, the segmented image set, the flipped image set, and the rotated image set.

Step S5: Train a semantic segmentation model based on the third remote sensing data training set and the second GIS data.

Figure 3:
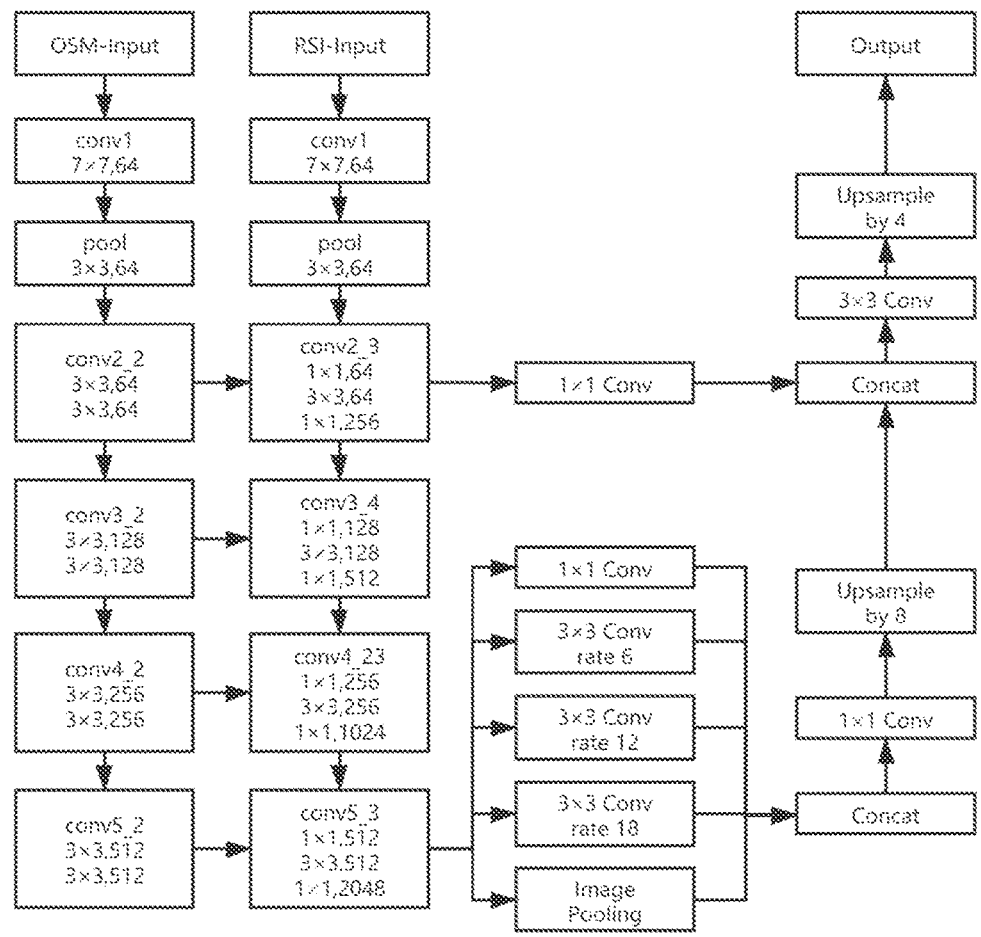
FIG. 3 is a structural diagram of a semantic segmentation model according to the present disclosure.

Further, step S5 may include the following: Construct a semantic segmentation model based on TensorFlow 2.1 and python 3.7. As shown in FIG. 3, the semantic segmentation model includes a backbone encoder, an auxiliary encoder, a hollow space pyramid, and a decoder. In this embodiment, the backbone encoder uses the ResNet-101 residual network, and the auxiliary encoder uses the ResNet-18 network.

In the figure, Cony denotes convolution; Pool denotes pooling; Concat denotes concatenation; rate denotes an expansion rate; Image Pooling denotes an image pool; Upsample denotes upsampling; OSM-Input denotes input of remote sensing data, where the remote sensing data is the third remote sensing data training set; and RSI-Input denotes input of geographic data, where the geographic data is the second GIS data.

The backbone encoder is configured to perform feature extraction on the third remote sensing data training set.

The auxiliary encoder is configured to perform feature extraction on the second GIS data.

Preferably, the backbone encoder may fuse feature mapping of a corresponding scale of the auxiliary encoder before each time of downsampling. In this way, the two data sources have respective encoders, and the semantic segmentation model can deeply integrate semantic features of the two data sources, thereby improving semantic segmentation accuracy.

The hollow space pyramid is used to learn semantic information of different pixels to resolve the problem of inconsistent sizes of input images, further improving semantic segmentation accuracy.

In addition to considering high-level features extracted by the backbone encoder, the decoder further fuses bottom-level features of the second time of downsampling to restore detailed information of the image as much as possible.

Step S6: Perform semantic segmentation on the remote sensing image to be segmented based on the first GIS data and the trained semantic segmentation model to obtain a semantic set.

Preferably, in the present disclosure, the semantic set may be further optimized based on a conditional random field to obtain an optimized semantic set to further improve semantic accuracy.

Figure 2:
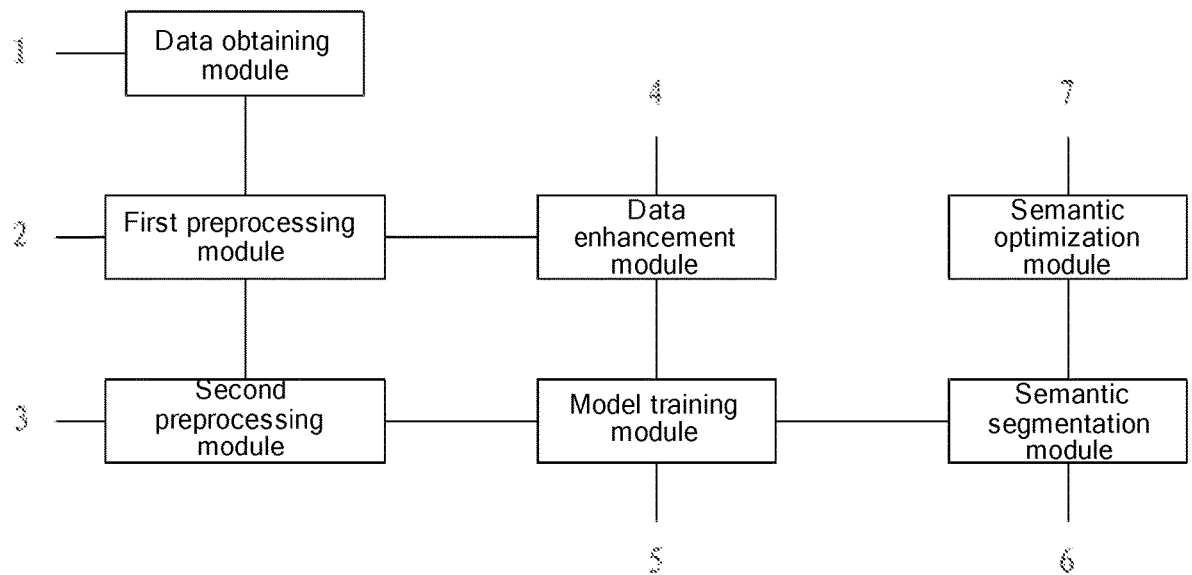
FIG. 2 is a structural diagram of a semantic segmentation system for a remote sensing image fusing GIS data according to the resent disclosure.

FIG. 2 is a structural diagram of a semantic segmentation system for a remote sensing image fusing GIS data. As shown in FIG. 2, the present disclosure further provides a semantic segmentation system for a remote sensing image fusing GIS data. The system includes a data obtaining module 1, a first preprocessing module 2, a second preprocessing module 3, a data enhancement module 4, a model training module 5, and a semantic segmentation module 6.

The data obtaining module 1 is configured to obtain a first remote sensing data training set and first GIS data, where the first remote sensing data training set includes n remote sensing training images, and n is a positive integer greater than 1.

The first preprocessing module 2 is configured to preprocess the first remote sensing data training set to obtain a second remote sensing data training set.

The second preprocessing module 3 is configured to preprocess the first GIS data based on the second remote sensing data training set to obtain second GIS data.

The data enhancement module 4 is configured to perform data enhancement on the second remote sensing data training set to obtain a third remote sensing data training set.

The model training module 5 is configured to train a semantic segmentation model based on the third remote sensing data training set and the second GIS data.

The semantic segmentation module 6 is configured to perform semantic segmentation on the remote sensing image to be segmented based on the first GIS data and the trained semantic segmentation model to obtain a semantic set.

In an optional implementation, the first preprocessing module 2 in the present disclosure may include a first initialization unit, a correction unit, a conversion unit, and a first determining unit.

The first initialization unit is configured to set the following condition: i=1. The correction unit is configured to perform geometric correction on an ith remote sensing training image to obtain an ith corrected remote sensing image.

The conversion unit is configured to perform coordinate system conversion on the ith corrected remote sensing image to obtain an ith coordinate remote sensing image.

The first determining unit is configured to determine whether i is greater than or equal to n; and if i is less than n, set the following condition: i=i+1, and return to the correction unit; or if i is greater than or equal to n, output the second remote sensing data training set, where the second remote sensing data training set includes n coordinate remote sensing images.

In an optional implementation, the second preprocessing module 3 in the present disclosure may include a second initialization unit, an aligning unit, a tailoring unit, and a second determining unit.

The second initialization unit is configured to set the following condition: i=1.

The aligning unit is configured to align the ith coordinate remote sensing image with the first GIS data based on latitude and longitude coordinates to obtain an ith aligned image.

The tailoring unit is configured to tailor the first GIS data in the ith aligned image based on the ith coordinate remote sensing image to obtain an ith GIS image.

The second determining unit is configured to determine whether i is greater than or equal to n; and if i is less than n, set the following condition: i=i+1, and return to the aligning unit; or if i is greater than or equal to n, output the second GIS data, where the second GIS data includes n GIS images.

In an optional implementation, the data enhancement module 4 in the present disclosure may include a third initialization unit, a zooming in/out unit, a segmentation unit, a flipping unit, a rotation unit, and a third determining unit.

The third initialization unit is configured to set the following condition: i=1.

The zooming in/out unit is configured to zoom in/out the ith coordinate remote sensing image to obtain an ith zoomed-in/out image.

The segmentation unit is configured to segment the ith coordinate remote sensing image to obtain an ith segmented image.

The flipping unit is configured to perform mirror flipping on the ith coordinate remote sensing image to obtain an ith flipped image.

The rotation unit is configured to rotate the zoomed-in/out image, the segmented image, and the flipped image by a predetermined angle for k times to obtain an ith rotated image, where k is a positive integer greater than 1.

The third determining unit is configured to determine whether i is greater than or equal to n; and if i is less than n, set the following condition: i=i+1, and return to zooming in/out unit; or if i is greater than or equal to n, output a zoomed-in/out image set, a segmented image set, a flipped image set, and a rotated image set.

The zoomed-in/out image set includes n zoomed-in/out images. The segmented image set includes n segmented images. The flipped image set includes n flipped images. The rotated image set includes n rotated images. The third remote sensing data training set includes the zoomed-in/out image set, the segmented image set, the flipped image set, and the rotated image set.

In an optional implementation, the system in the present disclosure may further include a semantic optimization module 7.

The semantic optimization module is configured to optimize the semantic set based on a conditional random field to obtain an optimized semantic set.

Each embodiment in the present specification is described in a progressive manner, each embodiment focuses on the difference from other embodiments, and the same and similar parts between the embodiments may refer to each other. For the system disclosed in the embodiment, since it corresponds to the method disclosed in the embodiment, the description is relatively simple, and reference can be made to the method description.

In this specification, several embodiments are used for illustration of the principles and implementations of the present disclosure. The description of the foregoing embodiments is used to help illustrate the method of the present disclosure and the core principles thereof. In addition, a person of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A semantic segmentation method for a remote sensing image fusing geographic information system (GIS) data, comprising:
    obtaining a first remote sensing data training set and first GIS data, wherein the first remote sensing data training set comprises n remote sensing training images, and n is a positive integer greater than 1;
    preprocessing the first remote sensing data training set to obtain a second remote sensing data training set;
    preprocessing the first GIS data based on the second remote sensing data training set to obtain second GIS data;
    performing data enhancement on the second remote sensing data training set to obtain a third remote sensing data training set;
    training a semantic segmentation model based on the third remote sensing data training set and the second GIS data; and
    performing semantic segmentation on the remote sensing image to be segmented based on the first GIS data and the trained semantic segmentation model to obtain a semantic set.

2. The semantic segmentation method for the remote sensing image fusing GIS data according to claim 1, wherein the preprocessing the first remote sensing data training set to obtain a second remote sensing data training set comprises:
    setting the following condition: i=1;
    performing geometric correction on an i th remote sensing training image to obtain an i th corrected remote sensing image;
    performing coordinate system conversion on the i th corrected remote sensing image to obtain an i th coordinate remote sensing image; and
    determining whether i is greater than or equal to n; and if i is less than n, setting the following condition: i=i+1, and returning to the step of "performing geometric correction on an i th remote sensing training image to obtain an i th corrected remote sensing image"; or if i is greater than or equal to n, outputting the second remote sensing data training set, wherein the second remote sensing data training set comprises n coordinate remote sensing images.

3. The semantic segmentation method for the remote sensing image fusing GIS data according to claim 2, wherein the preprocessing the first GIS data based on the second remote sensing data training set to obtain second GIS data comprises:
    setting the following condition: i=1;
    aligning the ith coordinate remote sensing image with the first GIS data based on latitude and longitude coordinates to obtain an ith aligned image;
    tailoring the first GIS data in the ith aligned image based on the ith coordinate remote sensing image to obtain an ith GIS image; and
    determining whether i is greater than or equal to n; and if i is less than n, setting the following condition: i=i+1, and returning to the step of "aligning the ith coordinate remote sensing image with the first GIS data based on latitude and longitude coordinates to obtain an ith aligned image"; or if i is greater than or equal to n, outputting the second GIS data, wherein the second GIS data comprises n GIS images.

4. The semantic segmentation method for the remote sensing image fusing GIS data according to claim 2, wherein the performing data enhancement on the second remote sensing data training set to obtain a third remote sensing data training set comprises:
    setting the following condition: i=1;
    zooming in/out the i th coordinate remote sensing image to obtain an i th zoomed-in/out image;
    segmenting the ith coordinate remote sensing image to obtain an ith segmented image;
    performing mirror flipping on the ith coordinate remote sensing image to obtain an i segmented image;
    rotating the zoomed-in/out image, the segmented image, and the flipped image by a predetermined angle for k times to obtain an ith rotated image, wherein k is a positive integer greater than 1; and determining whether i is greater than or equal to n; and if i is less than n, setting the following condition: i=i+1, and returning to the step of "zooming in/out the ith coordinate remote sensing image to obtain an i th zoomed-in/out image"; or if i is greater than or equal to n, outputting a zoomed-in/out image set, a segmented image set, a flipped image set, and a rotated image set, wherein the zoomed-in/out image set comprises n zoomed-in/out images, the segmented image set comprises n segmented images, the flipped image set comprises n flipped images, the rotated image set comprises n rotated images, and the third remote sensing data training set comprises the zoomed-in/out image set, the segmented image set, the flipped image set, and the rotated image set.

5. The semantic segmentation method for the remote sensing image fusing GIS data according to claim 2, after the performing semantic segmentation on the remote sensing image to be segmented based on the first GIS data and the trained semantic segmentation model, further comprising:

optimizing the semantic set based on a conditional random field to obtain an optimized semantic set.

* * * * *